United States Patent Office 2,980,273
Patented Apr. 18, 1961

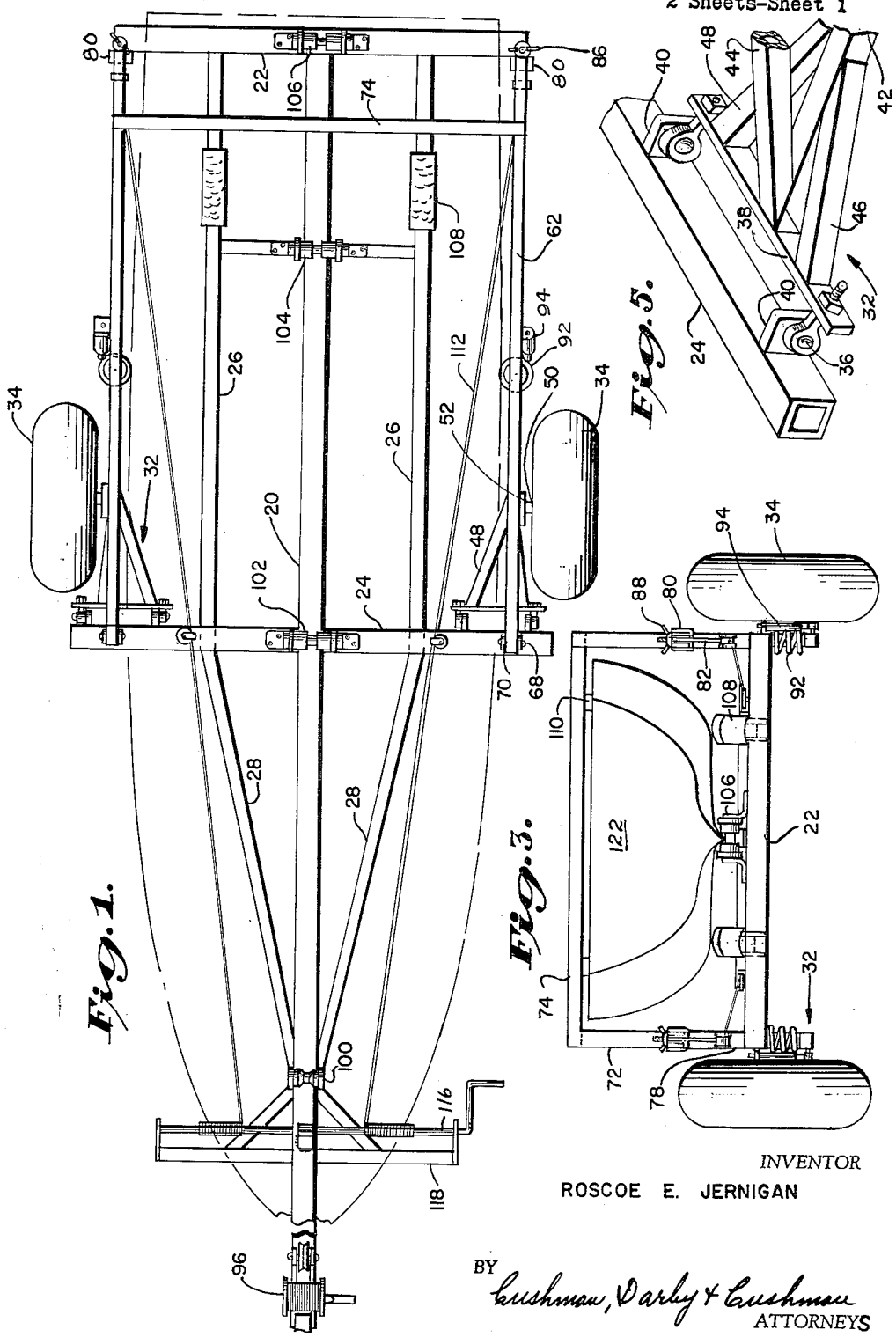

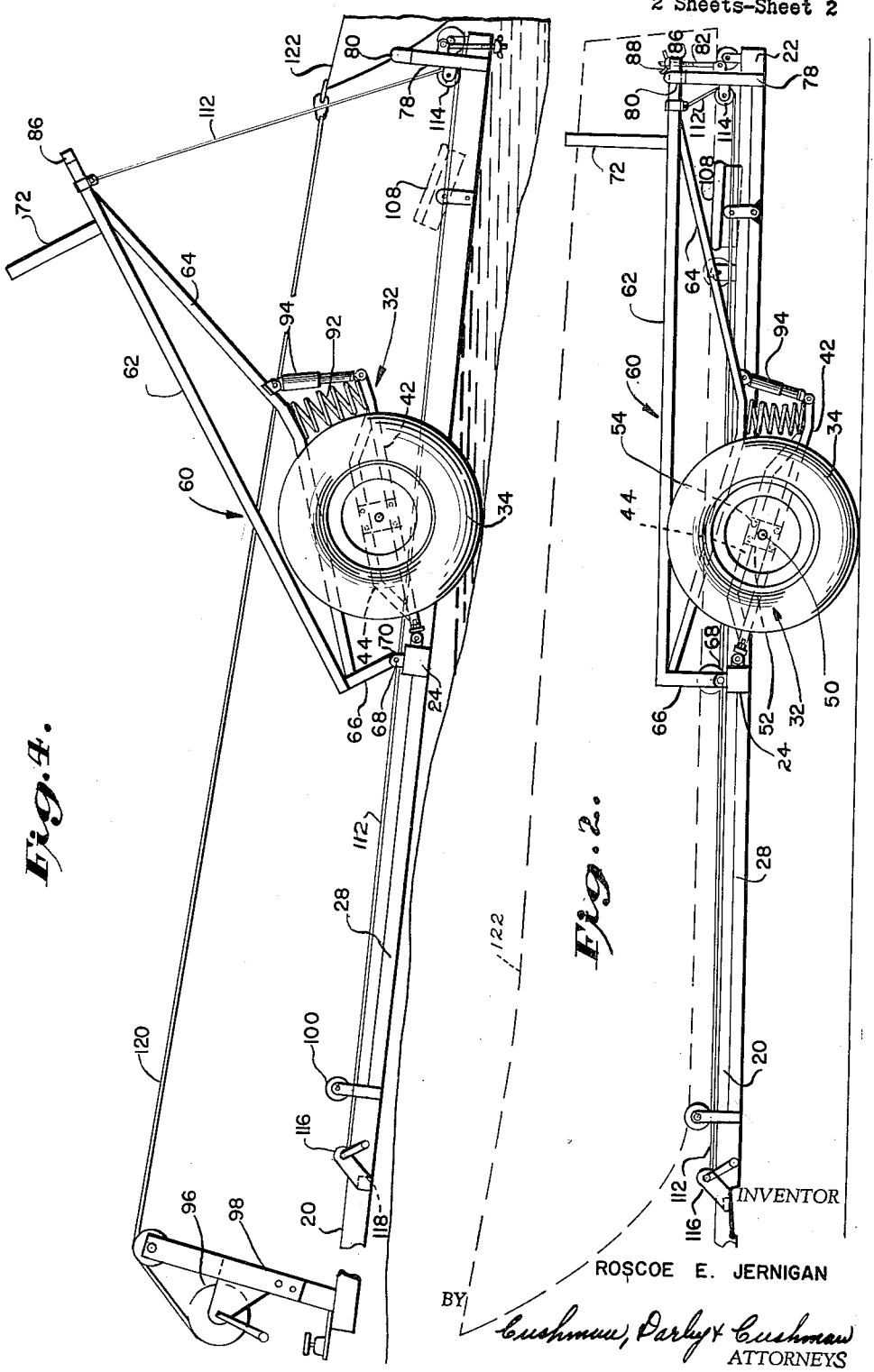

2,980,273
BOAT TRAILER
Roscoe E. Jernigan, 2nd and Henry Sts., Petersburg, Va.
Filed Sept. 10, 1958, Ser. No. 760,140
5 Claims. (Cl. 214—505)

This invention relates to an improved boat trailer.

More particularly, this invention relates to a trailer suitable for carrying small inboard or outboard type boats to a loading ramp where the boat may be launched directly into the water.

In recent years there have been many improvements in light boat trailers of the class described, particularly in the arrangements for facilitating loading and unloading of the boat on the trailer. Unfortunately, it appears that in most cases an increase in the ease with which a boat can be loaded or unloaded is accompanied by a decrease in the stability of the boat on the trailer during the period when the trailer is being towed.

It is an object of this invention to provide a new and improved boat trailer which is so constructed and arranged to firmly hold a boat being transported thereon but which can nevertheless be quickly and easily operated by one man when it is desired to launch a boat from the trailer into the water or to draw a boat resting on the water onto the trailer.

This and other objects of this invention will be fully understood from the following detailed description of a typical preferred form and application of the invention, throughout which description reference is made to the accompanying drawings in which:

Figure 1 is a plan view of the boat loading trailer, with a boat fully loaded thereon, illustrated in phantom;

Figure 2 is a side elevation of the boat trailer, with a boat fully loaded thereon, illustrated in phantom;

Figure 3 is an end elevation with a boat mounted on the trailer being illustrated in phantom;

Figure 4 is a side elevational view of the boat trailer located on a loading ramp with a boat floating on the water being loaded thereon; and Figure 5 is a perspective view of the attachment of the wheel arm to the forward transverse beam. For purposes of clarity, the wheel has been omitted from this figure.

Referring to the drawings, it will be seen that the boat trailer includes a frame made up of a main longitudinally extending beam 20 with a rear transversely extending beam 22 secured thereto at the rear end thereof and a forward transversely extending beam 24 secured thereto at or near its midpoint. Transverse beams 22 and 24 are braced one to the other by members 26 which extend parallel to main beam 20. Transverse beam 24 is also braced to the main beam 20 by oblique members 28.

Wheels 34 are mounted outboard of the frame on wheel mounting arms, generally indicated at 32, which extend generally forward to a pivotal engagement with the frame, and in this preferred embodiment with the forward transverse beam 24 at points outboard of the connection between the beam and bracing members 26 and 28. The pivotal engagement of wheel arm 32 with the beam 24 is such that the wheels and wheel arm can move, relative to the frame, through an arc parallel with the longitudinal axis of the frame.

While it is in the contemplation of this invention to use any of a wide variety of structures to form the wheel arm and any of a wide variety of pivotal connections between the wheel arm 32 and the beam 24, in this preferred embodiment (as is best shown in Figure 5) the pivotal connection consists of double pivot pins 36, fixed to a plate 38 extending parallel to the transverse beam, arranged to extend through suitable apparatus in flanges 40 which are fixed to the rearward surface of the beam. A main arm member 42 extends generally rearward at right angles to the plate 38 and is vertically braced by a truss 44. This main arm member 42 is also horizontally braced to plate 38 by oblique members 46 and 48. The wheel spindle 50 is fixed to bridge 52 which is, in turn, secured as by bolts 54, to the main arm member 42 and truss 44. For reasons that will be explained hereinafter, the arm 32 does not terminate at the spindle but rather continues generally rearwardly for a distance generally similar to the distance between the wheel spindle 50 and the forward end of the arm.

As shown in Figures 1, 2, 3 and 4, a second pair of arms 60, hereinafter called hold-down arms, not pivotally engaged with the transverse beam 24, at points equally spaced from main beam 20, to move through an arc parallel with the longitudinal axis of the frame. As will be evident hereinafter, the hold-down arms 60 always extend generally upward and rearwardly of the transverse beam 24. In this preferred embodiment, the distance between hold-down arms 60 is substantially identical with the distance between main arm members 42 of wheel arms 32. The hold-down arms 60 each have sufficient length to extend to a point directly over the rear transverse beam 22 when the arms are pivoted to a position wherein their free ends are at a maximum distance rearwardly of the forward transverse beam 24.

While it is within the contemplation to use any of a wide variety of structures to form the hold-down arm, and any of a wide variety of pivotal connections between the hold-down arm and the beam 24, in this preferred embodiment the hold-down arm consists of a main member 62 vertically braced by underslung truss 64. At the forward end of the main member 62 is a pivot engaging member 66 extending generally downward and at right angles to the main member. The free end of the pivot engaging member is pivotally engaged with the transverse beam 24 by a pin 68 extending through suitable apertures in a bracket 70, the latter being fixed on the upper surface of the beam.

Near the rear ends of each main member 62 is a generally upwardly extending member 72 fixed at right angles to the former. A transverse member 74, hereinafter called hold-down bar 74, joints the two arms 60 by being its attachment to the free ends of the generally upwardly extending members 72. As will be evident from the explanation of the operation of the boat trailer which will follow, various other structures may be used to define the hold-down arm, the important thing being the hold-down arms 60 must provide a satisfactory mounting for hold-down bar 74, which must be spaced a suitable distance above the frame when the arm is in the loaded position.

Secured to the rearward transverse beam 24 is a pair of upwardly extending members 78 equally spaced from main beam 20 and spaced one from the other a distance equal to the transverse distance between the free ends of the arms 60. The free ends of members 78 are formed as saddles 80 defining longitudinally extending slots having a transverse width at least as great as the transverse thickness of the free ends of the arms 60. The free ends of the hold-down arms 60 form saddles 86 defining vertically extending slots. Each of the upwardly extending members 78 have a drawbolt 82 pivotally mounted thereto on the rear surface thereof, the arrangement being such that when the free ends of the arms 60 rest within the saddles 80 the drawbolts 82 are positioned to extend through the slots defined by saddles 86, the arms can be firmly secured in position by conventional manipulation of wingnuts 88 on the drawbolt. It should be understood that while the drawbolt arrangement is used in this preferred embodiment, it is within the contemplation of this invention to use any of a large variety of conventional fastening means for securing the free end of the arms 60 into fast engagement with the free ends of the upwardly extending members 78, or any equivalent member on the frame.

It has already been explained that the wheel arms 32 and the hold-down arms 60 are each arranged to pivot in generally similar arcs, which are parallel with the longitudinal axis of the frame. While these pivotal movements are not identical, they are not completely free one from the other inasmuch as the free end of the wheel arms 32 is joined to its corresponding hold-down arm 60 by suitable resilient means such as compression springs 92 and shock absorbers 94.

A conventional winch 96 is suitably mounted upon an upstanding member 98 affixed to the main beam 20 at a point near its forward end. A number of keel supporting means, such as keel rollers 100, 102, 104 and 106, are located above the main beam 20 along the length thereof and the frame is also provided with hull supporting means, such as chocks 108, which are mounted on longitudinal braces 26. It should be understood that the exact arrangement of the keel rollers and the chocks may be varied considerably, depending upon the configuration of the hull of the boat to be carried and the method of supporting the boat deemed most satisfactory for use therewith.

The undersurface of the transverse hold-down bar 74 is provided with a pair of pads 110 uniformly spaced from the longitudinal axis of the frame. If the trailer is to be only used with one boat, these pads may be permanently mounted but it is within the contemplation of this invention that they may be transversely adjustable so as to fit the configuration of the various types of boats with which the trailer can be used, as will become evident in explanation of the operation of the trailer which will follow.

A cable 112 is affixed to each hold-down arm 60 at a point near its free end, rove through a pulley 114 fixed to the forward surface of the corresponding vertically extending member 78, and then extends forwardly to a winch 116. The winch 116 is here illustrated as a crank having elongated stem pivotally mounted on a transversely extending arm 118 fixed to the main beam 20, but it is within the contemplation of this invention that some other form of winch be used and that the cables 112 may be joined into a single cable at some point between the pulleys 114 and the winch.

It should here be mentioned that in the preferred embodiment illustrated, the attachment of the various elements to each other is effected by welding. However, it should be clearly understood that it is equally within the contemplation of this invention to join them by bolts, riveting, or other suitable means.

Operation

The operation of this boat trailer may be most easily understood by reference to Figure 4 wherein the trailer has been disengaged in its tractor and rolled down a landing ramp until the transverse beam is approximately level with the water. The drawbolts are loosened and disengaged from the ends of the hold-down arms 60. When this occurs the weight of the trailer (and a boat loaded thereon) will have a tendency to cause it to move downwardly relative to the wheels 34, which are supported by the ramp. This movement can be otherwise categorized as pivotal movement of the wheel arm 32 relative to the trailer which will, because of the resilient connection between the wheel arm and the hold-down arm 60, tend to result in a similar relative movement between the hold-down arm and the frame of the trailer. However, the last mentioned movement is prevented by the tension in cables 112 until the winch 116 is released. When this is done the cables 112 are then played out (by rotation of winch 116) to allow the free ends of arms 60 to move away from the saddles 80 on upwardly extending arms 78, in response to the weight of the trailer upon wheels 34. When the arms 60 have lifted to a position to provide ample clearance between the boat to be drawn on the trailer and the hold-down bar 74 (this position is somewhat exaggerated in Figure 4 for purposes of illustration), the cable 120 from winch 96 is secured to the prow of the boat 122 and the latter is then drawn onto the trailer by reeling in that cable. When the boat has been drawn onto the desired position on the trailer, as indicated, for example, by firm contact between the underside of the boat with the chocks 108, the winch 116 is operated to wind in cables 112 and hence to draw the hold-down arms 60 downwardly until their free ends rest within the saddles 80 of the upwardly extending members 78. The drawbolts are then engaged in saddles 86 and the wingnuts 88 manipulated to hold the respective elements in fast engagement. If the rollers 100, 102, 104 and 106 and chocks 108 have been given proper vertical adjustment for use with the boat in question, the pads 110 will then firmly engage the gunwales of the boat and hold it against rocking when the trailer is being towed.

As should now be evident, the lowering of hold-down arm 60 will effect a downward movement of the wheels, and hence of wheel arms 32, relative to the frame of the trailer. Inasmuch as the wheels are still firmly ground upon the ramp, this relative movement manifest itself by an upward movement of the frame. The trailer, with the boat securely mounted thereon, may be then towed away from the ramp and onto the highway in the usual manner.

When the boat trailer is to be used to unload or launch a boat mounted thereon, the procedure is just the opposite from which has already been explained. That is to say, the trailer is run onto a ramp with the rear transverse beam 22 at or just above the surface of the water. The free ends of the holddown arm 60 are released from their engagement with the vertically extending members 78 and the cable 112 is then unwound from winch 116 to allow the ends of the hold-down arms 60 to rise until the pads 110 on the undersurface of the hold-down bar 74 are well clear of the gunwales. This movement is accompanied by a lowering of the frame as a whole due to the relative movement between the wheel arms 32 and the frame. The conventional lock or ratchet on winch 96 is then released and the winch is operated to control the movement of the boat along the keel rollers and into the water.

It will now be evident that the compression springs 92 act as riding springs when the hold-down arm 60 is locked in engagement with the frame, and that the shock absorbers 94 will serve to dampen the activity of this spring in a conventional manner.

Having described only a typical preferred form and application of my invention, I do not wish to be limited or restricted to specific details herein set forth but wish to reserve to myself any variations or modifications that may appear to those skilled in the art and falling within the scope of the following claims:

I claim:

1. A boat trailer comprising an elongated frame having a boat support means thereon; a first pair of arms, each pivotally mounted on the respective transverse sides of the frame to move in an arc parallel to the longitudinal axis of the frame; wheel means pivotally mounted on each of said arms at points equally removed from the pivotal connection of the arms to the frames; a second pair of arms, each pivotally mounted on the frame at the respective transverse sides thereof to move in an arc parallel to the longitudinal axis of said frame; resilient compression means extending from each of said first pair of arms to its corresponding second arm whereby each of the second arms is resiliently urged away from each of said first arms, a transverse member extending from one second arm to the other second arm; means to draw said second arms and said transverse member toward said frame when a boat is disposed on said boat supporting means until said transverse member contacts said boat to hold the same firmly upon the trailer; the connection of said compression means to said first arms and to said second arms being such that the above-mentioned movements of said second arms are accompanied by the compression means' imparting a resilient downward force upon the free ends of said first arms and by an upward movement of said frame relative to said wheel means; said compression means acting as a riding spring when said transverse member is disposed in the last mentioned position.

2. The structure defined in claim 1 and further including: releasable lock means for securing each of said second arms in a fixed position relative to said frame; depending means on said transverse member to engage a boat resting on said boat supporting means and to hold the boat fast on the trailer when the transverse member is dispersed in the last mentioned position and to hold the second arms in fixed positions.

3. A boat trailer comprising an elongated frame having a boat support means thereon; a first pair of arms, each pivotally mounted on the respective transverse sides of the frame to move in an arc parallel to the longitudinal axis of the frame; wheel means pivotally mounted on each of said arms at points equally removed from the pivotal connection of the arms to the frames; a second pair of arms, each pivotally mounted on the frame at the respective transverse sides thereof to move in an arc parallel to the longitudinal axis of said frame; spring means connected to each of said first arms, each of said spring means being also connected to a corresponding second arm; a transverse member extending from one second arm to the other second arm; the connections of said spring means and said second arm being such that each of said spring means always resiliently urges its corresponding first arm downwardly; means to draw said second arms and said transverse member toward said frame when a boat is disposed on said boat supporting means until said transverse member contacts said boat to hold the same firmly upon the trailer; the connection of said spring means to said first arms and to said second arms being such that such movement of the second arms is accompanied by the spring means' imparting a resilient downward force upon the free ends of said first arms relative to the frame and by an upward movement of said frame relative to said wheel means; said spring means acting as a riding spring when said transverse member is disposed in the last mentioned position.

4. The structure defined in claim 3 and further including: releasable lock means for securing each of said second arms in a fixed position relative to said frame; depending means on said transverse member to engage a boat resting on said boat support means and to hold the boat fast on the trailer when the transverse member is disposed in the last mentioned position and to hold the second arms in fixed positions.

5. The trailer design in claim 3 wherein the connection of said spring means to each of said first arms is at a point which is more remote from the pivotal connection of the first arm to the frame than is the point wherein said wheel means are pivotally mounted thereon.

References Cited in the file of this patent

UNITED STATES PATENTS

| | | |
|---|---|---|
| 2,506,699 | Byrd | May 9, 1950 |
| 2,761,576 | Sanborn | Sept. 4, 1956 |
| 2,807,381 | Tegeler | Sept. 24, 1957 |